(12) United States Patent
Iwai et al.

(10) Patent No.: US 11,115,570 B2
(45) Date of Patent: Sep. 7, 2021

(54) IMAGING APPARATUS

(71) Applicant: CANON KABUSHIKI KAISHA, Tokyo (JP)

(72) Inventors: Keita Iwai, Kawasaki (JP); Ryoji Okuno, Yokohama (JP); Hidetoshi Kei, Tokyo (JP); Jiro Yamamoto, Chofu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/740,156

(22) Filed: Jan. 10, 2020

(65) Prior Publication Data

US 2020/0252530 A1    Aug. 6, 2020

(30) Foreign Application Priority Data

Jan. 31, 2019 (JP) .............................. JP2019-016312

(51) Int. Cl.
*H04N 5/225* (2006.01)
*G03B 13/02* (2021.01)
*H04N 5/232* (2006.01)

(52) U.S. Cl.
CPC ....... *H04N 5/225251* (2018.08); *G03B 13/02* (2013.01); *H04N 5/2254* (2013.01); *H04N 5/23293* (2013.01)

(58) Field of Classification Search
CPC .......... H04N 5/225251; H04N 5/2254; H04N 5/23293; G03B 13/02; G03B 17/04
See application file for complete search history.

(56) References Cited

U.S. PATENT DOCUMENTS

| | | | |
|---|---|---|---|
| 2003/0133705 A1* | 7/2003 | Cho | G03B 13/02 396/176 |
| 2004/0056970 A1* | 3/2004 | Westerweck | G02B 7/102 348/240.3 |
| 2011/0050973 A1* | 3/2011 | Sugaya | H04N 5/2251 348/333.01 |
| 2011/0194849 A1* | 8/2011 | Noh | G03B 15/05 396/175 |
| 2012/0134662 A1* | 5/2012 | Soil | G03B 13/02 396/544 |
| 2016/0073032 A1* | 3/2016 | Obana | H04N 5/23293 348/333.06 |
| 2017/0054916 A1* | 2/2017 | Sato | H04N 5/232941 |
| 2017/0187964 A1* | 6/2017 | Sato | H04N 5/23293 |

FOREIGN PATENT DOCUMENTS

JP        2017-21303 A    1/2017

* cited by examiner

*Primary Examiner* — Chiawei Chen
(74) *Attorney, Agent, or Firm* — Canon U.S.A., Inc. I.P. Division

(57) ABSTRACT

An imaging apparatus includes a finder unit including a finder rotation unit movable between two states, a retracted state and a protruded state. The finder rotation unit is rotatably held in the protruded state.

9 Claims, 7 Drawing Sheets

IMAGING APPARATUS

BACKGROUND OF THE INVENTION

Field of the Invention

The present disclosure relates to an imaging apparatus including an electronic viewfinder, and more particularly to a digital camera.

Description of the Related Art

Conventionally, a camera including an electronic viewfinder (hereinafter referred to as a "finder") is known as a camera in which a finder can be rotated with respect to a camera main body so that the degree of freedom of imaging posture of a user is increased.

Japanese Patent Application Laid-Open No. 2017-21303 discusses an imaging apparatus including a finder that can be rotated using a rotation mechanism.

However, in a configuration discussed in Japanese Patent Application Laid-Open No. 2017-21303, a finder unit always protrudes from an external form of a camera. Therefore, the finder interferes with a photographing operation or hindered portability, for example, carrying the camera when not in use.

SUMMARY OF THE INVENTION

The present disclosure is directed to reducing the size of a finder that can be rotated with respect to a camera main body and providing an imaging apparatus including a finder that does not protrude from the camera main body when not in use.

According to an aspect of the present disclosure, an imaging apparatus includes an electronic viewfinder unit movable between a retracted state where the electronic viewfinder unit is retracted in a main body and a protruded state where the electronic viewfinder unit is protruded from the main body. The electronic viewfinder unit includes a rotation unit including an electronic display unit, and an exterior cover covering the rotation unit. In the protruded state, the rotation unit is rotatable about a rotation shaft held by the exterior cover. One end of a flexible board connected to the electronic display unit is bent by the rotation shaft, and another end of the flexible board is connected to a board that does not rotate together with the rotation unit. The flexible board includes a flexible portion with an amount of flexure variable by rotation of the rotation unit.

Further features of the present disclosure will become apparent from the following description of exemplary embodiments with reference to the attached drawings.

DESCRIPTION OF THE EMBODIMENTS

Figure 1A:
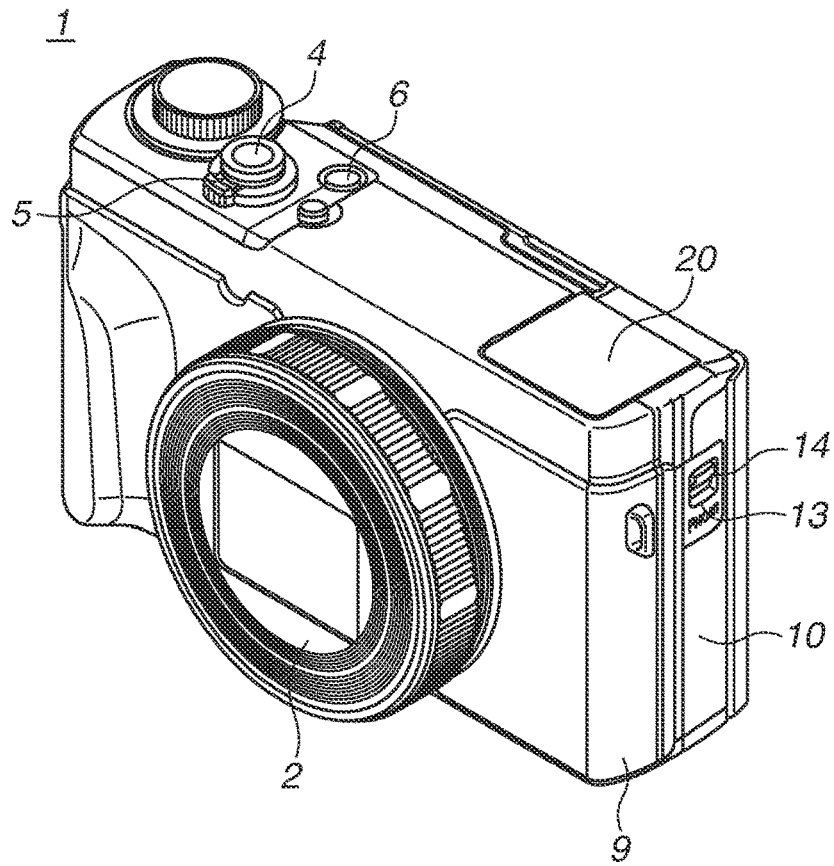
FIGS. 1A and 1B are perspective views of an imaging apparatus according to an exemplary embodiment of the present disclosure.

Hereinafter, embodiments of the present disclosure will be described in detail with reference to the drawings.

In each drawing, the same reference numerals are assigned to the same members, and duplicate descriptions are omitted.

Figure 1B:
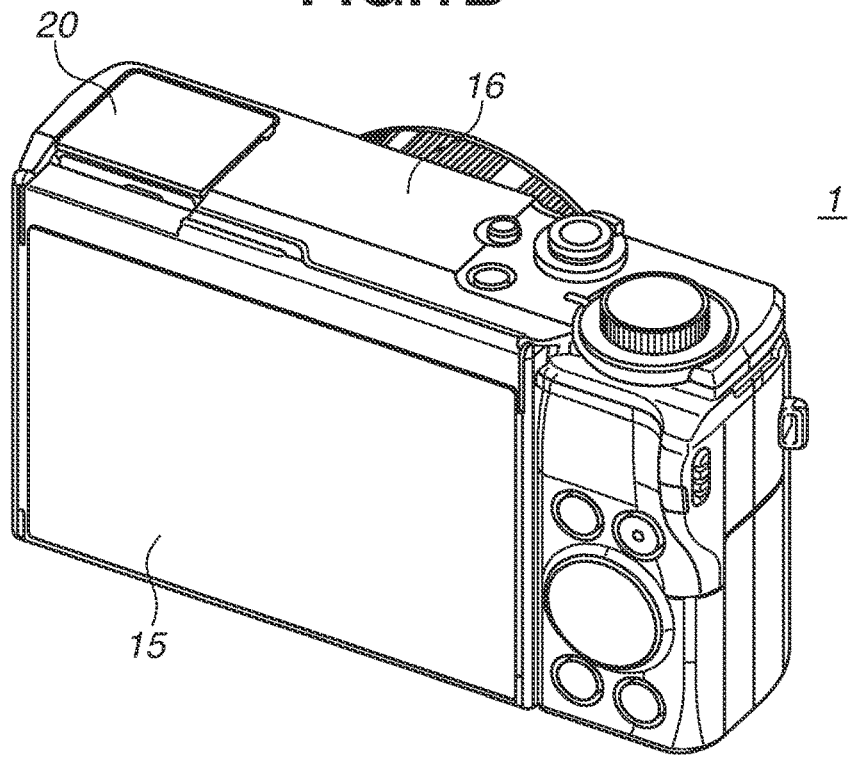

With reference to FIGS. 1A and 1B, a configuration of an imaging apparatus 1 which is an example of an imaging apparatus according to an exemplary embodiment of the present disclosure will be described.

FIGS. 1 and 2 are perspective views of the imaging apparatus 1. FIGS. 1A and 1B are a front perspective view and a rear perspective view of the imaging apparatus 1, respectively.

The imaging apparatus 1 includes a lens barrel unit 2 including an imaging lens (not illustrated) and an imaging element (not illustrated) that photoelectrically converts an optical image of a subject formed through the imaging lens to generate image data.

The lens barrel unit 2 is of a retractable lens structure and is retracted into the imaging apparatus 1 when housed.

In addition, the imaging apparatus 1 includes a main board (not illustrated), an auxiliary board (not illustrated), and the like on which a processing circuitry that converts image data generated by the imaging element into digital information is mounted.

When a release button 4 is fully pressed, an image is captured and the image data of a subject image is recorded on a recording medium (not illustrated).

A zoom lever 5 is rotatably held on an outer periphery of the release button 4. When the zoom lever 5 is rotated, a zoom operation is performed.

A power button 6 is pressed by a user to be turned on or off.

A display device 15 is provided on a back surface of the imaging apparatus 1, and is used for checking a subject image to be captured or for reproducing and displaying the captured image.

The imaging apparatus 1 is covered with exterior members such as a front cover 9, a rear cover 10, and a top cover 16.

The top cover 16 forms an external appearance of an upper part of the imaging apparatus 1 and also forms an opening of a finder 20.

The finder 20 is built in the imaging apparatus 1 and is locked in a state of being held inside the imaging apparatus 1 by a lock mechanism during the retraction.

On a side surface of the imaging apparatus 1, a side cover 13 is constructed, which forms a part of the external appearance.

A release lever 14 is slidably held in the side cover 13. By operating the release lever 14, the lock of the finder 20 is released and the finder 20 is protruded above the imaging apparatus 1.

Figure 2A:
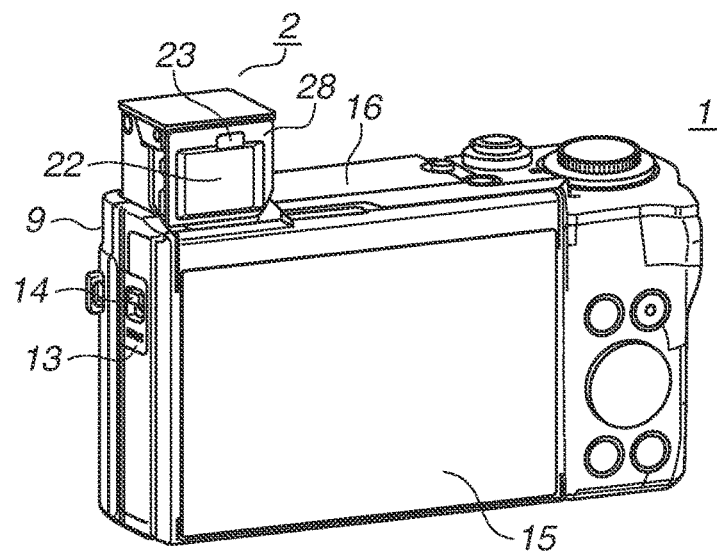
FIGS. 2A, 2B, and 2C are perspective views of the imaging apparatus where a finder is protruded.
Figure 2B:
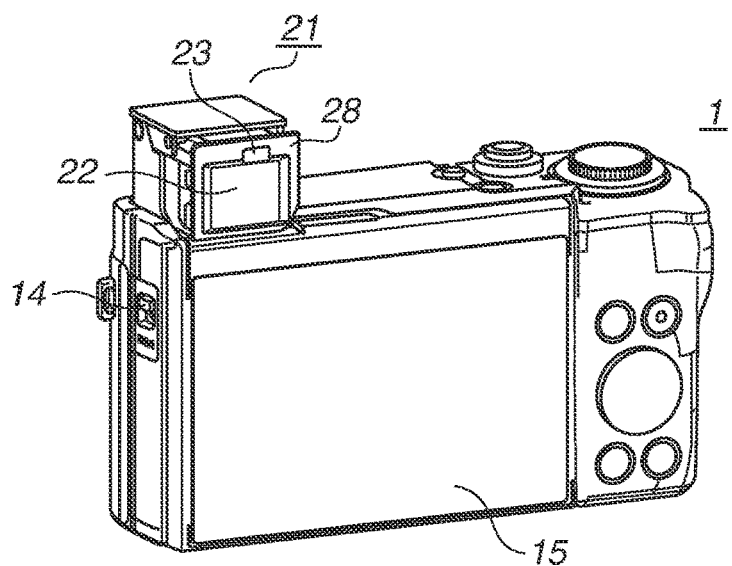
Figure 2C:
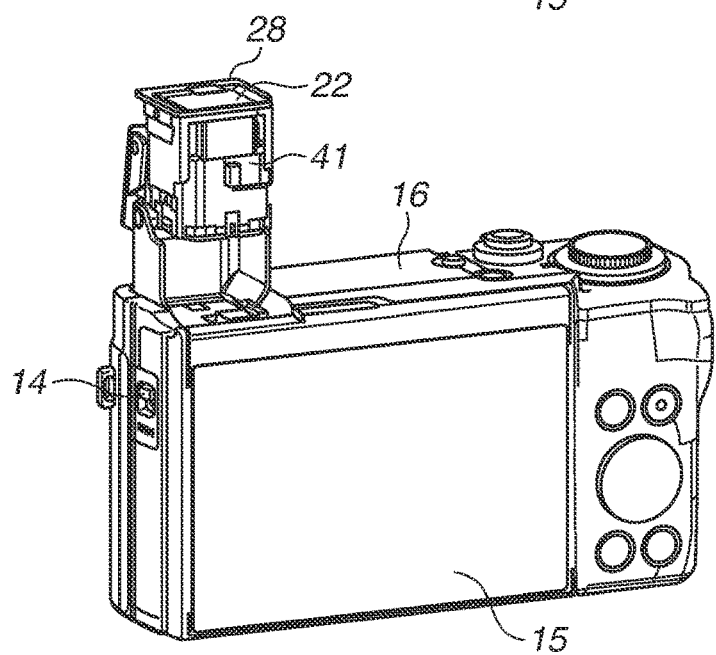

With reference to FIGS. 2A to 2C, an operation of the finder 20 of the present exemplary embodiment illustrated in FIG. 1 will be described.

FIGS. 2A to 2C are rear perspective views of the imaging apparatus, where the finder 20 is protruded.

FIG. 2A illustrates a state where the finder 20 protrudes upward from the retracted state in the imaging apparatus 1 by operating the release lever 14 disposed on the side surface of the imaging apparatus 1 described above.

An eyepiece window 22 is fixed to an eyepiece unit 28. A sensor window 23 is provided on the upper side of the eyepiece window 22.

The sensor window 23 is provided for an optical path of an internal sensor, for example, an optical detection sensor.

The internal optical sensor detects that the user has looked at the eyepiece unit 28, and switches to a display on the finder 20.

FIG. 2B illustrates a state where the eyepiece unit 28 of the finder 20 is pulled out to a rear side of the imaging apparatus 1 from the protruded state of the finder 20 in FIG. 2A.

The finder 20 can be used in a state where the eyepiece unit 28 is pulled out to a near side, and it is possible to, from the eyepiece unit 28, check a subject image to be captured or reproduction and display of the captured image.

FIG. 2C illustrates a state where a finder rotation unit 41 including the eyepiece unit 28 is rotated in a usable state of the finder 20 in FIG. 2B.

The finder rotation unit 41 rotates approximately 90° to a position where the eyepiece unit 28 is parallel to the top cover 16.

Accordingly, the user can also confirm the subject image to be captured from the upper surface side of the camera and confirm reproduction and display of the captured image.

With reference to FIGS. 3A to 3D, a slide suppression mechanism against the retracted state after the protruded state will be described.

Figure 3A:
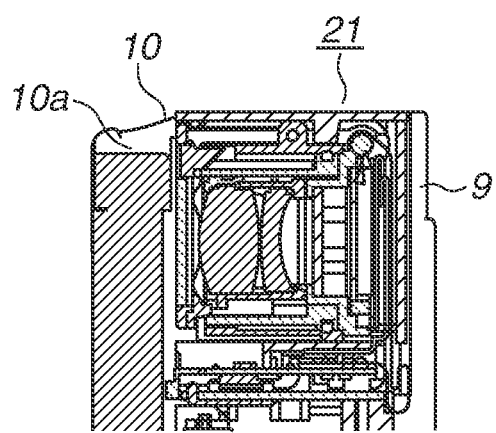
FIGS. 3A, 3B, 3C, and 3D are views illustrating a slide suppression mechanism.
Figure 3B:
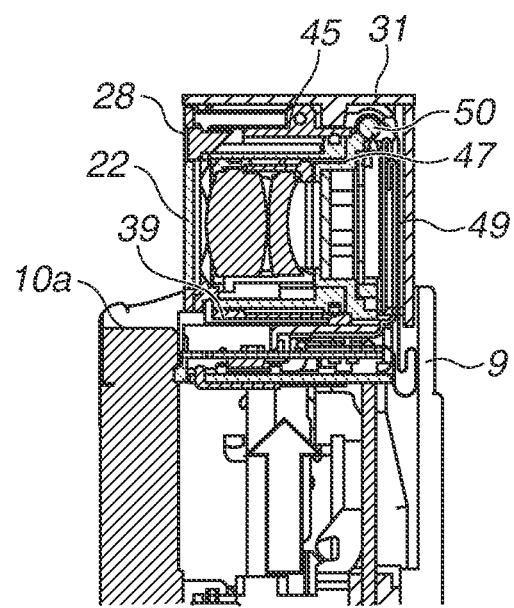
Figure 3C:
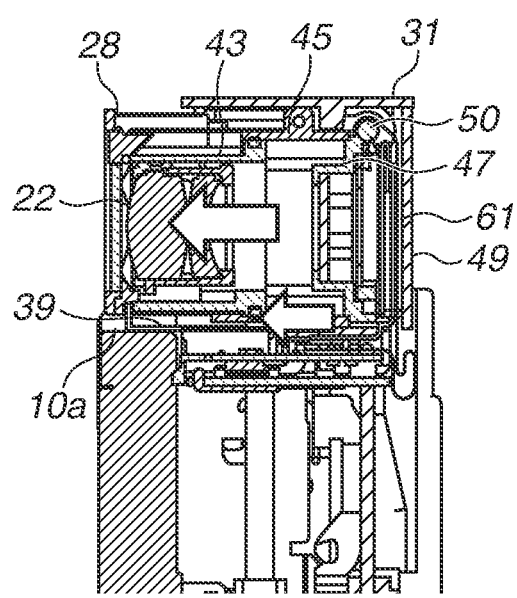
Figure 3D:
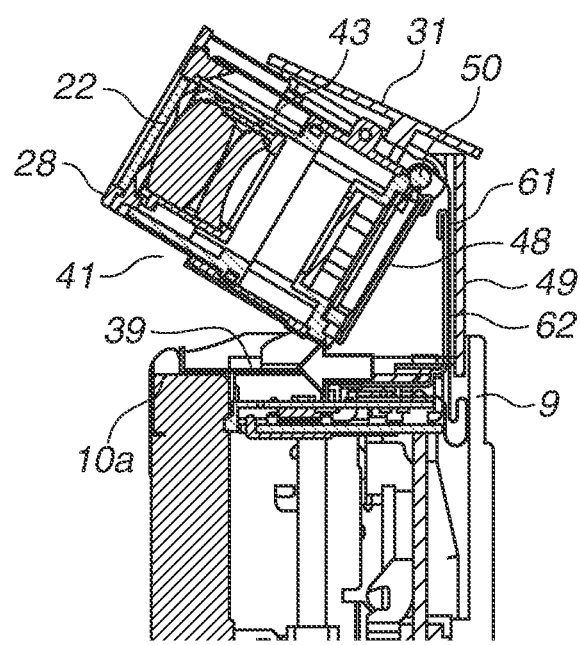

FIGS. 3A and 3B respectively illustrate the retracted state and the protruded state, and FIGS. 3C and 3D respectively illustrate a state where the eyepiece unit 28 is pulled out and a state where the finder rotation unit 41 is rotated.

As illustrated in FIGS. 3A and 3B, the finder unit 21 includes a slide stopper 39 and integrally performs a vertical sliding operation in the retracted state and the protruded state. The rear cover 10, which is a part of the exterior, includes an exterior engaging portion 10a.

As illustrated in FIG. 3C, the slide stopper 39 is pulled out in conjunction with pulling out the eyepiece unit 28 in a direction of an arrow, and abuts on the exterior engaging portion 10a.

Thus, the finder unit 21 is restrained from sliding toward a retracted state side. In addition, the slide stopper 39 is always pushed in a direction of an arrow by a spring (not illustrated).

Therefore, as illustrated in FIG. 3D, the slide stopper 39 remains in contact with the exterior engaging portion 10a even when the finder rotation unit 41 rotates.

As a result, the finder unit 21 continues to be restrained from sliding toward the retracted state side in a state where the eyepiece unit 28 is pulled out.

In this way, the eyepiece unit 28 is pulled out from the finder unit 21 after the protruded state, and the finder unit 21 is thereby restrained from moving in a retracted state direction.

Therefore, there will be no defect such that the finder unit 21 falls inadvertently when using the camera and a finder display image cannot be viewed.

Contrary to the previous case, in the transition to the retracted state, by the operation of FIGS. 3D, 3C, 3B, and 3A in this order, the slide stopper 39 is released from the exterior engaging portion 10a, and the finder unit 21 is retracted in the imaging apparatus 1.

Figure 4A:
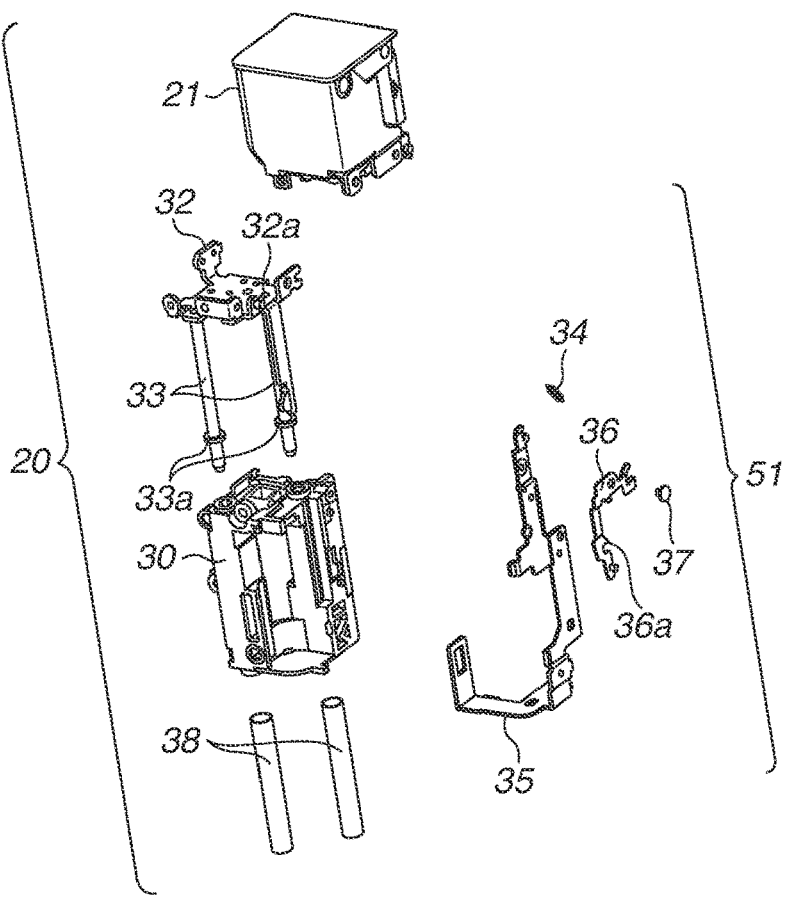
FIGS. 4A and 4B are exploded perspective views illustrating a configuration of the finder.
Figure 4B:
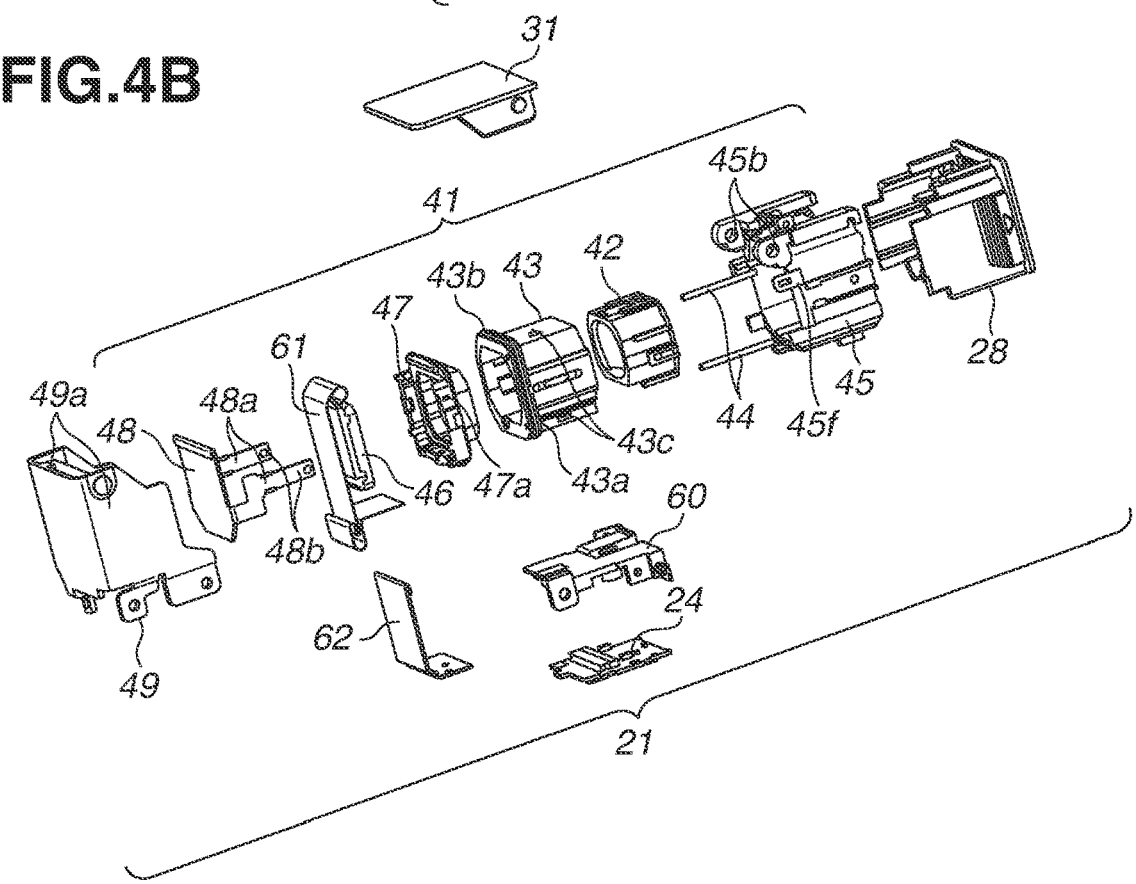

With reference to FIGS. 4A and 4B, a configuration of the finder 20 will be described. FIG. 4A is an exploded perspective view of the finder 20.

The finder unit 21 includes the eyepiece unit 28 and a lens holder 42 that holds a lens guiding a light flux emitted from a display unit 46 to the eyepiece unit 28.

In the protruded state, the finder rotation unit 41 is rotatable about a finder unit rotation shaft 50, which is held by a finder cover 49 and is perpendicular to an optical axis of the lens.

As illustrated in FIG. 4A, the finder 20 includes the finder unit 21 and a vertical movement mechanism unit 51 that switches between the retracted state and the protruded state.

FIG. 4A is an exploded perspective view for explaining the vertical movement mechanism unit 51 constituting the finder 20. A base plate 32 is formed of a metal plate, and two guide bars 33 formed of a metal material are swaged.

In addition, on the base plate 32, an engaging pin 32a is formed. The guide bars 33 are formed with flange-shaped portions 33a to partially increase in a radial direction.

An electronic viewfinder (EVF) holder 30 is made of a resin material, and the two guide bars 33 swaged to the base plate 32 are inserted into and held in the EVF holder 30 to be slidable up and down.

In doing so, a slide position at the time of protrusion is determined by the flange-shaped portions 33a of the guide bars 33 contacting the EVF holder 30.

The EVF holder 30 is positioned and fixed with respect to the front cover 9 illustrated in FIG. 1. Protrusion springs 38 are retracted inside the EVF holder 30 and push the guide bars 33 upward.

A spring holder 35 is made of a sheet metal material and is fixed to the EVF holder 30 to suppress each of end portions of the protrusion springs 38.

A lock lever 36 is rotatably held with respect to the spring holder 35 by a swaging pin 37, and includes an engaging claw portion 36a.

One end of an urging spring 34 is held engaged with the lock lever 36 and the other end is held engaged with the spring holder 35. The urging spring 34 is configured in a state of urging the lock lever 36 in one direction.

The lock lever 36 is configured so that an operation of the release lever 14 illustrated in FIG. 1 allows the lock lever 36 to rotate about the swaging pin 37.

During the retraction, the finder 20 is held in the retracted state by the engaging pin 32a of the base plate 32 being engaged by the engaging claw portion 36a of the lock lever 36.

Upon use of the finder 20, the release lever 14 is operated and thus the lock lever 36 rotates to release the engagement of the engaging pin 32a, and the finder 20 thereby protrudes.

The configuration of the finder unit 21 will be described.

FIG. 4B is an exploded perspective view of the finder unit 21. The finder unit 21 is provided with a finder top cover 31 that forms the external appearance of an upper surface together with the top cover 16.

In addition, the finder unit 21 includes a finder cover 49 including two side surfaces 49a parallel to a movable direction in the protruded state.

The finder rotation unit 41 constituting the finder unit 21 includes the lens holder 42 that holds an optical lens and a finder guide cylinder 43 that holds the lens holder 42 to be linearly movable.

Guide shafts 44 that guide the finder guide cylinder 43 to be linearly movable penetrate through a flange portion 43a of the finder guide cylinder 43.

One end of each of the guide shafts 44 is fixed to a finder fixture cylinder 45. The eyepiece unit 28 is engaged with the finder guide cylinder 43 by engaging claws 43c provided on the side surface of the finder guide cylinder 43.

By pulling out the eyepiece unit 28 to the near side, the finder guide cylinder 43 pivotally supported by the guide shafts 44 translates integrally with the lens holder 42 that is provided inside, and the eyepiece unit 28 becomes ready for use.

A seal member 43b is provided on an outer periphery of the flange portion 43a of the finder guide cylinder 43.

The seal member 43b seals between the finder fixture cylinder 45 and the finder guide cylinder 43 to form a dust-proofing structure.

A display unit holder 47 holds the display unit 46. An engaging claw 47a is provided on the side surface of the display unit holder 47, and is integrated by an engaging portion 45f on the finder fixture cylinder 45 side.

A display panel urging plate 48 includes arm portions 48a fixed to the finder fixture cylinder 45 and urges the display unit 46 toward the display unit holder 47 side.

Each of tips 48b of the arm portions 48a doubles as a click portion with respect to the finder guide cylinder 43 that operates integrally when the eyepiece unit 28 is pulled to the near side.

A board base 60 is provided between the lower part of the finder unit 21 and the vertical movement mechanism unit 51 that switches between the retracted state and the protruded state.

The board base 60 is fixed to the base plate 32 together with the finder cover 49 by a plurality of fastening screws.

A finder board 24 is fixed to the board base 60.

The finder board 24 is connected to a flexible board (not illustrated) for transmitting an image signal from a main board (not illustrated) inside the imaging apparatus 1, and further transmits a signal by a flexible board 61 connected to the display unit 46.

A flexible board cover 62 is fixed to the board base 60.

Figure 5:
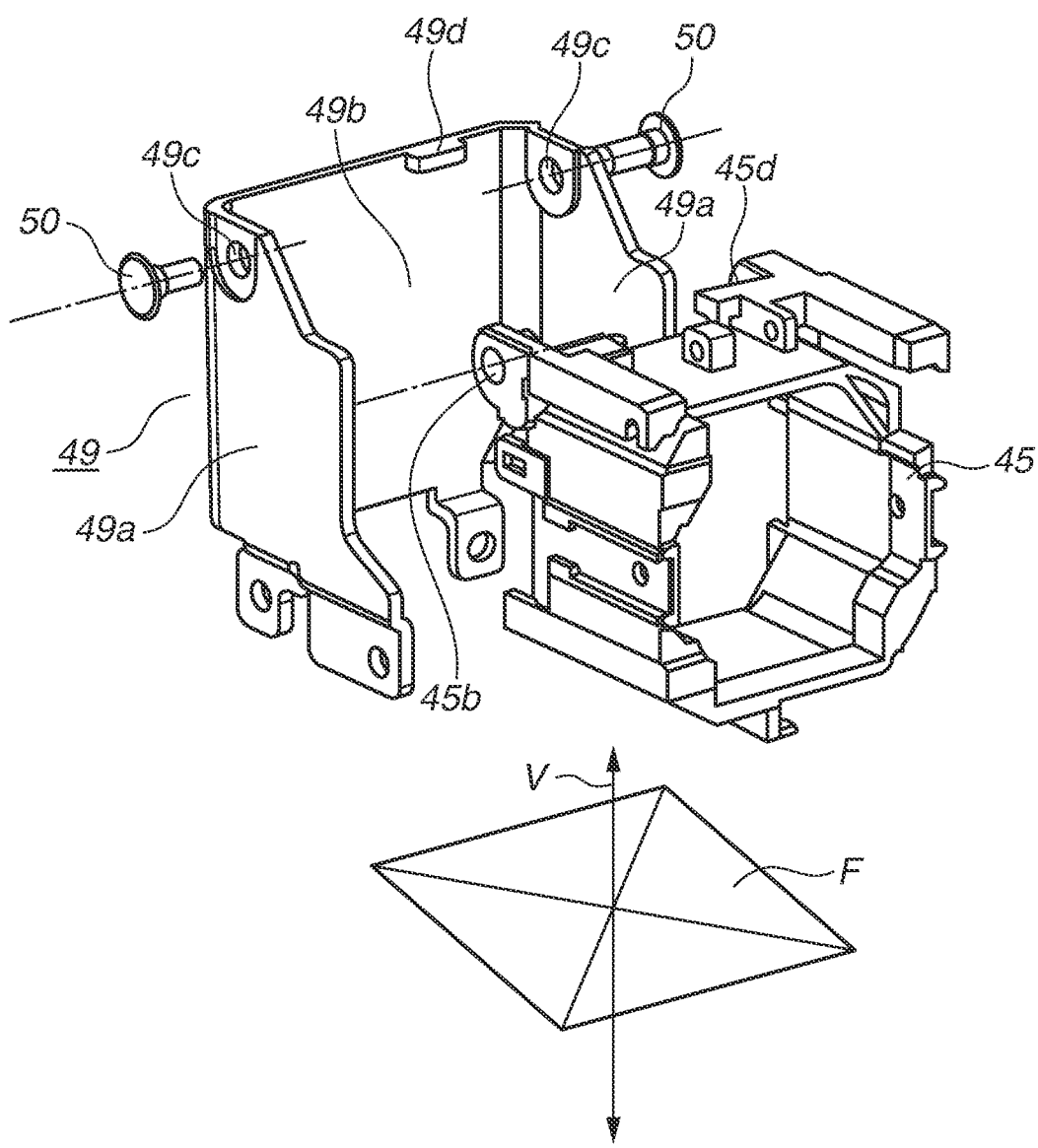
FIG. 5 is an explanatory view of a finder cover and a rotation operation of the finder.

With reference to FIG. 5, the finder cover 49 and a rotation operation of the finder 20 will be described.

The finder unit rotation shaft 50 is rotatably engaged with a shaft hole portion 45b provided on the finder fixture cylinder 45 constituting the finder rotation unit 41, and is held by a first side of the two side surfaces 49a and a second side of the two side surfaces 49a of the finder cover 49.

FIG. 5 is a view illustrating a relation between the finder cover 49 and the finder fixture cylinder 45.

The finder unit rotation shaft 50 is held in holes 49c provided on the respective two side surfaces 49a constituting the finder cover 49.

The strength of the finder unit rotation shaft 50 can be secured as a rotary shaft by being coupled to the finder cover 49 having rigidity.

In the finder fixture cylinder 45, a part of the finder unit rotation shaft 50 is rotatably engaged with the shaft hole portion 45b.

Therefore, the finder fixture cylinder 45 can be rotated with respect to the finder cover 49. The finder cover 49 is provided with a rotation stopper portion 49d.

The finder fixture cylinder 45 has a configuration where a contact portion 45d contacts the rotation stopper portion 49d when the finder fixture cylinder 45 rotates approximately 90°.

The finder rotation unit 41 can be rotated between 0° and 90°, where an optical axis of a finder lens is substantially parallel to an optical axis of the imaging lens.

In the present exemplary embodiment, the finder unit rotation shaft 50 is divided into two members, but can be configured by a single member.

A friction member (not illustrated) that applies friction is sandwiched between the finder cover 49 and a shaft hole portion 45b provided on the finder fixture cylinder 45.

The friction member is, for example, a disc spring or an O-ring, and the rotation operation can be stopped at an arbitrary position by a frictional force applied by the friction member.

The finder cover 49 includes the two side surfaces 49a, which are parallel, and a linking surface 49b on the subject side that links the two side surfaces 49a together, and is substantially U-shaped in a cross section F perpendicular to a movable direction V between the retracted state and the protruded state.

Holes 49c are provided on both sides of the two side surfaces 49a, which are parallel, constituting the finder cover 49.

The holes 49c provided on the finder cover 49 are on the opposite side of the eyepiece window 22 and on the upper side of the finder unit 21 in the imaging apparatus 1.

Therefore, in a rotation operation of the finder unit 21, the finder rotation unit 41 operates to move away from the exterior members such as the top cover 16 and the front cover 9 of the imaging apparatus 1, and thus there is no interference with the imaging apparatus 1 due to the rotation operation.

For this reason, the finder cover 49 is substantially U-shaped in a cross section in a movable direction between the retracted state and the protruded state, and it is possible to secure the strength necessary for the rotation operation.

Figure 6A:
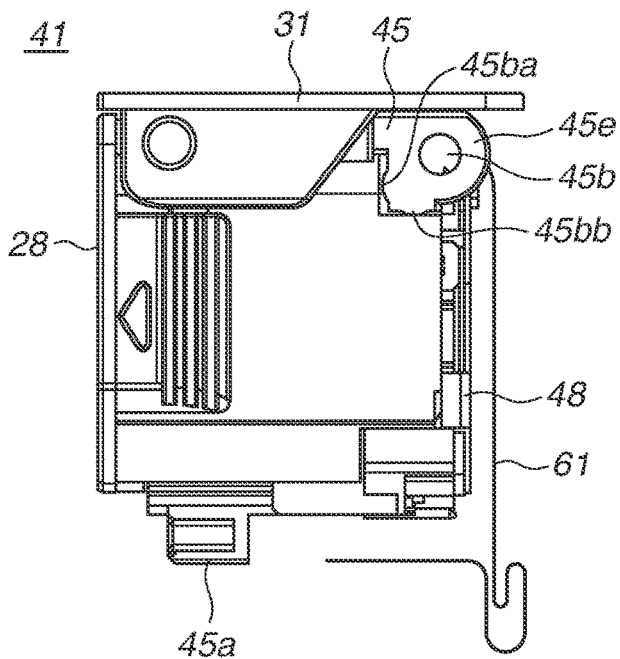
FIGS. 6A, 6B, and 6C are explanatory views of a finder rotation unit.
Figure 6B:
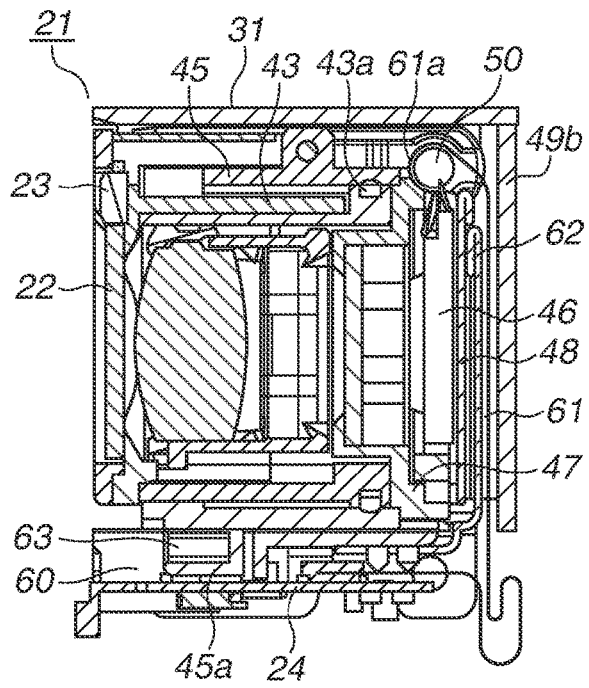
Figure 6C:
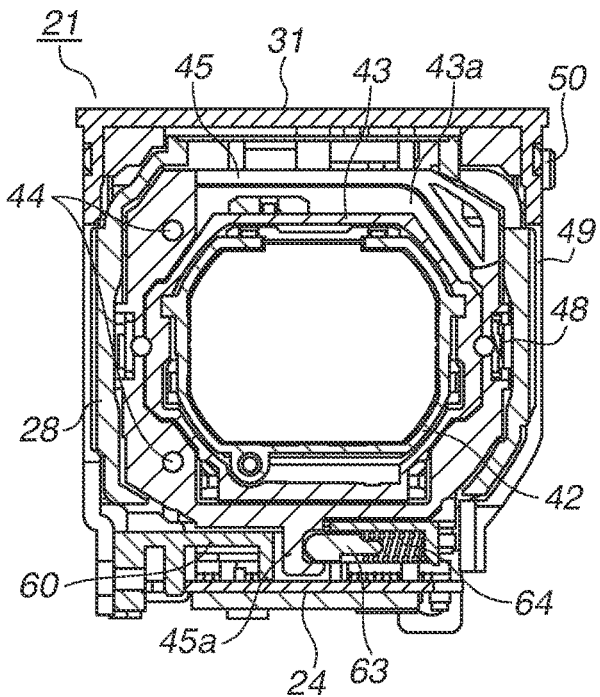

With reference to FIGS. 6A to 6C, the finder rotation unit 41 constituting the finder unit 21 will be described.

FIG. 6A is a view seen from the side of the finder rotation unit 41.

An engaging portion 45a for restricting a rotation operation of the finder rotation unit 41 in the protruded state is provided at the lower part of the finder fixture cylinder 45.

In addition, a bearing portion 45e for pivotally supporting with respect to the finder cover 49 that forms the external appearance is provided at the upper part of the finder fixture cylinder 45.

The bearing portion 45e is provided with the shaft hole portion 45b. The bearing portion 45e is also provided with a first contact portion 45ba.

The first contact portion 45ba is in contact with a surface of the eyepiece unit 28 parallel to a display screen of the display unit 46. Moreover, the bearing portion 45e is provided with a second contact portion 45bb.

The second contact portion 45bb is in contact with the surface of the eyepiece unit 28 parallel to the optical axis of the finder lens.

The shaft hole portion 45b is rigid because the finder unit rotation shaft 50 is engaged.

Therefore, by providing the first contact portion 45ba and the second contact portion 45bb on the bearing portion 45e of the finder fixture cylinder 45, an abutting surface and a sliding surface when retracting the eyepiece unit 28 are provided at the rigid portion of the finder fixture cylinder 45.

Therefore, it is possible to improve the reliability of an operation of the eyepiece unit 28.

FIG. 6B is a cross-sectional view of the finder unit 21 illustrated in FIGS. 4A and 4B.

The holes 49c provided on the finder cover 49 are on the opposite side of the eyepiece window 22 and on the upper side of the finder unit 21 in the imaging apparatus 1.

Therefore, in the rotation operation of the finder unit 21, the finder rotation unit 41 operates to move away from the exterior members such as the top cover 16 and the front cover 9 of the imaging apparatus 1, and thus there is no interference with the imaging apparatus 1.

The finder unit rotation shaft 50 is disposed within projection in a thickness direction of the display unit 46.

The finder unit rotation shaft 50 does not affect the dust-proofing structure between the flange portion 43a of the finder guide cylinder 43 and the finder fixture cylinder 45.

Therefore, an internal layout of the finder unit 21 can be configured in a space-saving manner.

One end of the flexible board 61 is connected to the display unit 46 on the side of the finder unit rotation shaft 50.

The flexible board 61 forms a flexible portion 61a having a center substantially the same as the center of the finder unit rotation shaft 50, and is disposed to pass through a gap between the flexible board cover 62 and the finder cover 49.

FIG. 6C is a cross section perpendicular to the optical axis of the finder lens of the finder unit 21.

An engaging member 63 is slidably attached to the board base 60 by an urging spring 64.

The engaging portion 45a provided at the lower part of the finder fixture cylinder 45 is restricted by the engaging member 63 from rotating.

The engaging member 63 retracts against the urging spring 64 during the rotation operation of the finder rotation unit 41, and the engaging portion 45a gets over the engaging member 63.

Therefore, the finder rotation unit 41 constituting the finder unit 21 is engaged in a state of being parallel to the optical axis of the finder lens and an imaging lens (not illustrated).

In order to prevent the finder rotation unit 41 from rotating about the finder unit rotation shaft 50, the finder unit 21 includes the engaging member 63 that keeps the optical axis of the lens guiding light to the eyepiece unit 28 parallel with the optical axis of an imaging optical system, and the board base 60 for holding the engaging member 63, to which the engaging member 63 is slidably attached.

The flexible board cover 62 is integrated with the board base 60 for holding the engaging member 63, and covers the finder board 24 that does not rotate together with the finder rotation unit 41.

Figure 7A:
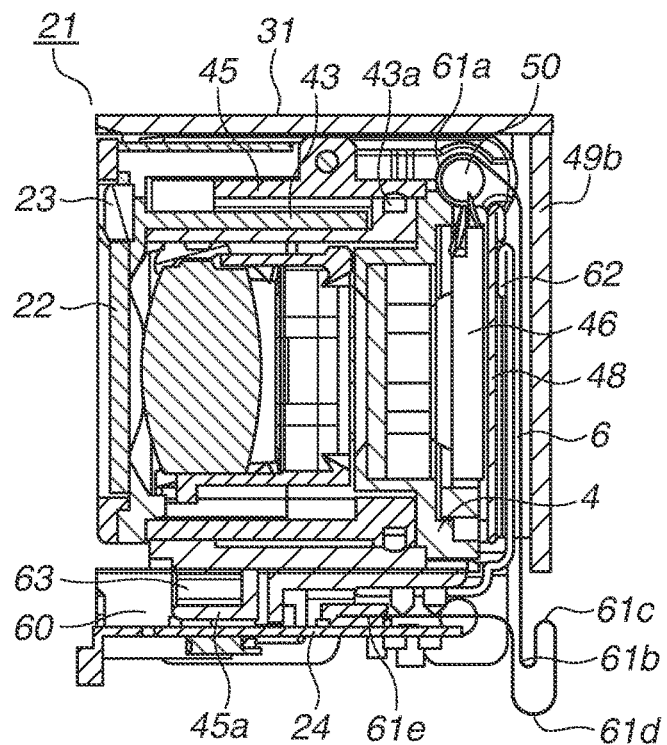
FIGS. 7A and 7B are explanatory views of a layout of a flexible board.
Figure 7B:
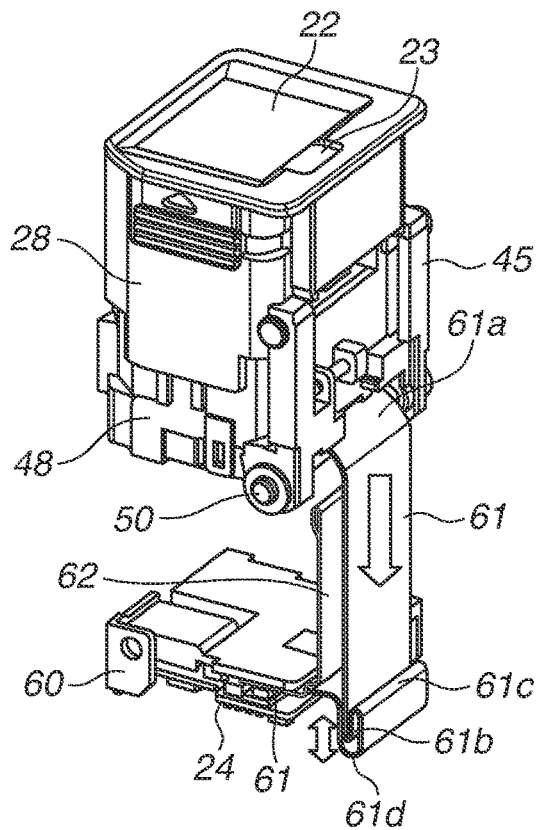

With reference to FIGS. 7A and 7B, a layout of the flexible board 61 inside the finder unit 21 will be described.

The imaging apparatus 1 includes the finder unit 21 that is movable between the retracted state where the finder unit 21 is retracted in the main body and the protruded state where the finder unit 21 is protruded from the main body.

The finder unit 21 includes the finder rotation unit 41 including the display unit 46, and the finder cover 49 covering a rotation unit, which is the finder rotation unit 41.

In the protruded state, the finder rotation unit 41 is rotatable about the finder unit rotation shaft 50 held by the finder cover 49.

One end of the flexible board 61 connected to the display unit 46 is bent by the finder unit rotation shaft 50, and the other end of the flexible board 61 is connected to the finder board 24 that does not rotate together with the finder rotation unit 41. In the flexible board 61, an amount of flexure of the flexible portions 61a to 61d of the flexible board 61 is variable by the rotation of the finder rotation unit 41.

The finder cover 49 is integrally formed of the two side surfaces 49a to which the finder unit rotation shaft 50 of the finder rotation unit 41 is attached and the linking surface 49b that links the two side surfaces 49a together.

When viewed from a direction where the finder unit rotation shaft 50 extends, the flexible board cover 62 of the flexible board 61 is disposed between the display unit 46 and the linking surface 49b.

When viewed from the direction where the finder unit rotation shaft 50 extends, the flexible board 61 is disposed in the gap between the linking surface 49b of the finder cover 49 and the flexible board cover 62.

The flexible board 61 includes a first flexible portion 61a on one end side of the flexible board 61, and a second flexible portion 61d on another end side of the flexible board 61.

Third flexible portions 61b and 61c are provided between the first flexible portion 61a and the second flexible portion 61d in the movable direction of the finder unit 21.

The first flexible portion 61a is wound around the finder unit rotation shaft 50.

The radius of the first flexible portion 61a is larger than the radius of the third flexible portions 61b and 61c.

The radius of the second flexible portion 61d is larger than the respective radii of the third flexible portions 61b and 61c.

The display panel urging plate 48, which urges the display unit 46, includes the arm portions 48a fixed to the finder fixture cylinder 45 and rotates together with the finder rotation unit 41.

FIG. 7A is a cross-sectional view of the finder unit 21 perpendicular to the finder unit rotation shaft 50.

One end of the flexible board 61 is connected to the display unit 46 on the side of the finder unit rotation shaft 50.

The flexible board 61 is a flexible printed wiring board having a thickness of about 0.1 mm to 0.2 mm with a resin such as polyimide as a base material.

The flexible board 61 forms the first flexible portion 61a having a center substantially same as the center of the finder unit rotation shaft 50, and is disposed to pass through the gap between the flexible board cover 62 and the finder cover 49.

The flexible board cover 62 is formed of a metal plate. An end surface of the flexible board cover 62 on the side close to the finder unit rotation shaft 50 is bent by 180° by hemming.

For this reason, the flexible board 61 does not come into contact with the end surface of the flexible board cover 62.

Therefore, the finder rotation unit 41 can be rotated without obstructing an arrangement configuration of the finder unit rotation shaft 50.

The finder unit rotation shaft 50 is divided into two members, but can be configured by a single member.

In addition, the flexible board 61 is not exposed even if the finder rotation unit 41 rotates inside the finder cover 49, and is protected by the flexible board cover 62, and thus the reliability can be improved.

The flexible board 61 is disposed to form a plurality of flexible portions 61b, 61c, and 61d at a point where the flexible board 61 passes through the gap between the flexible board cover 62 and the finder cover 49.

The first and second flexible portions 61a and 61d at both ends each have a larger radius than the respective radii of the flexible portions 61b and 61c that are provided inside. A connection terminal portion 61e of the flexible board 61 is connected to the finder board 24.

With reference to FIG. 7B, a movable portion of the flexible board 61 will be described.

When the finder unit 21 rotates, the flexible portion 61a of the flexible board 61 is bent in the vicinity of the finder unit rotation shaft 50.

The radius of the flexible portion 61a is larger than the shaft radius of the finder unit rotation shaft 50 by being arranged outside the finder unit rotation shaft 50.

The flexible portion 61a is moved by the rotation operation of the finder unit 21, and stress is thereby generated in the flexible board 61.

For this reason, it is possible to prevent breaking by the large radius of the flexible portion 61a. FIG. 7B illustrates an inner state of the finder cover 49, in a case where the finder unit 21 rotates approximately 90°.

When the finder unit 21 rotates approximately 90°, the flexible portion 61a moves.

That is, in the flexible board 61, ¼ of the circumference of the flexible portion 61a is generated as an extra length portion (flexible portion).

Then, the extra length portion (flexible portion) generated by the movement passes through the gap between the flexible board cover 62 and the finder cover 49 and goes in the direction of an arrow.

As a result, the extra length portion (flexible portion) generated by the movement is absorbed by moving the center of the flexible portion 61b in parallel.

The radius of the flexible portion 61b can be smaller than the radius of the flexible portion 61a because the flexible portion 61b only needs to move downward in parallel when absorbing the extra length portion (flexible portion).

With regard to the center of the flexible board 61, it is only necessary to provide the absorbing point of the extra length portion (flexible portion) before the connection terminal portion 61e.

As described above, the flexible portion 61b that absorbs the extra length portion (flexible portion) is provided, and thus the movement of the flexible board 61 due to the rotation operation of the finder unit 21 does not affect the connection reliability of the connection terminal portion 61e.

Moreover, by providing the flexible portion 61c having a smaller radius than the radius of the flexible portion 61a, in the flexible portion 61b, it is possible to provide the absorbing point of the extra length portion (flexible portion) between the vertical movement mechanism unit 51 and the front cover 9.

By providing the absorbing point of the extra length portion (flexible portion) outside the finder unit 21, the finder unit 21 can be downsized without affecting the connection reliability of the connection terminal portion 61e.

In addition, in the present exemplary embodiment, the finder board 24 is fixed to the base plate 32 of the board base 60 by a plurality of fastening screws.

For this reason, the finder board 24 is moved up and down by the vertical movement mechanism unit 51 with respect to the EVF holder 30 of the finder unit 21 illustrated in FIGS. 4A and 4B.

However, when the finder board 24 is not moved up and down, it is only necessary to move the flexible portion 61d. In other words, when the finder board 24 does not move up and down, the extra length of the vertical movement of the finder unit 21 is absorbed by the flexible portion 61d.

As for the radius of the flexible portion 61d, stress is generated in the flexible board 61 by the vertical movement of the finder unit 21. Thus, the radius of the flexible portion 61d is increased to prevent breaking.

The flexible portion 61b is the extra length portion (flexible portion) of the rotation operation of the finder unit 21, and the flexible portion 61d is the extra length portion (flexible portion) of the vertical movement of the finder unit 21, which are different movable extra length portions (flexible portions).

Accordingly, the flexible board 61 includes a plurality of flexible portions of the flexible portion 61a, the flexible portion 61b, the flexible portion 61c, and the flexible portion 61d at different heights in a vertical movement direction, and the flexible portions 61a and 61d at both ends have larger radii than the radii of the inner flexible portions 61b and 61c, respectively.

This makes it possible to arrange the extra length portion (flexible portion) in a space-saving manner when movable portions that move up and down and rotate are included.

The display panel urging plate 48 is a metal plate and is thermally coupled by being in contact with the display unit 46.

The display unit 46 is a heat source that generates heat with higher definition and higher frame rate. The display panel urging plate 48 is held by the finder fixture cylinder 45, and rotates along with the rotation operation of the finder rotation unit 41.

The display panel urging plate 48 has a thermal conductivity higher than the thermal conductivity of the flexible board cover 62, and thereby also functions as a heat radiation member of the display unit 46.

The other end of the flexible board 61 is connected to the finder board 24 fixed to the board base 60.

The board base 60 covers the finder board 24.

Even when the finder rotation unit 41 rotates, the finder board 24 is not exposed to the outside and is protected by the board base 60, and thus the reliability can be improved.

According to the present exemplary embodiment, it is possible to provide an imaging apparatus including a small and rotatable finder having no protrusion with respect to the main body of the imaging apparatus when the finder is not used.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-016312, filed Jan. 31, 2019, which is hereby incorporated by reference herein in its entirety.

What is claimed is:

1. An imaging apparatus comprising:
an electronic viewfinder unit configured to be movable between a retracted state where the electronic viewfinder unit is retracted in a main body and a protruded state where the electronic viewfinder unit is protruded from the main body,
wherein the electronic viewfinder unit includes a rotation unit, where the rotation unit includes an electronic display unit and an exterior cover to cover the rotation unit,
wherein, in the protruded state, the rotation unit is rotatable about a rotation shaft held by the exterior cover, where the exterior cover is integrally formed of attachment surfaces to which the rotation shaft of the rotation unit is attached and a linking surface that links the attachment surfaces,
wherein one end of a flexible board connected to the electronic display unit is bent by the rotation shaft, and another end of the flexible board is connected to a finder board that does not rotate together with the rotation unit, where the flexible board includes a flexible portion with an amount of flexure variable by the rotation of the rotation unit, and where a protective cover for the flexible board is disposed between the electronic display unit and the linking surface when viewed from a direction where the rotation shaft extends, and wherein the flexible board is disposed in a gap between the linking surface of the exterior cover and the protective cover when viewed from the direction where the rotation shaft extends.

2. The imaging apparatus according to claim 1,
wherein the flexible portion of the flexible board includes a first flexible portion on one end side of the flexible board, a second flexible portion on another end side of the flexible board, and a third flexible portion between the first flexible portion and the second flexible portion in a movable direction of the electronic viewfinder unit,
wherein the first flexible portion is wound around the rotation shaft, and
wherein a radius of the first flexible portion is larger than a radius of the third flexible portion.

3. The imaging apparatus according to claim 2,
wherein the third flexible portion includes a fourth flexible portion and a fifth flexible portion, and
wherein the radius of the first flexible portion is larger than a radius of the fourth flexible portion and a radius of the fifth flexible portion.

4. The imaging apparatus according to claim 2, wherein a radius of the second flexible portion is larger than the radius of the third flexible portion.

5. The imaging apparatus according to claim 1, wherein the rotation shaft is rotatably engaged with a shaft hole portion provided on a fixture cylinder constituting the rotation unit, and is held by a first surface and a second surface of the exterior cover.

6. The imaging apparatus according to claim 5, wherein an urging member includes arm portions fixed to the fixture cylinder and is configured to urge the electronic display unit and to rotate together with the rotation unit.

7. The imaging apparatus according to claim 6, wherein the urging member is thermally coupled to the electronic display unit.

8. The imaging apparatus according to claim 7, wherein the urging member has thermal conductivity higher than thermal conductivity of the protective cover.

9. An imaging apparatus comprising:
an electronic viewfinder unit having an eyepiece unit, a lens holder to hold a lens, and a rotation unit that includes an electronic display unit and an exterior cover to cover the rotation unit, wherein the electronic viewfinder unit is configured to be movable between a retracted state where the electronic viewfinder unit is retracted in a main body and a protruded state where the electronic viewfinder unit is protruded from the main body;
an engaging member configured to keep an optical axis of the lens guiding a light flux emitted from the electronic display unit to the eyepiece unit parallel with an optical axis of an imaging optical system; and
a board base attached to the engaging member,
wherein the rotation unit is perpendicular to the optical axis of the lens and, in the protruded state, the rotation unit is rotatable about a rotation shaft by the exterior cover,
wherein the board base slidably holds the engaging member to prevent the rotation unit from rotating about the rotation shaft,
wherein one end of a flexible board connected to the electronic display unit is bent by the rotation shaft, and another end of the flexible board is connected to a finder board that does not rotate together with the rotation unit, where the flexible board includes a flexible portion with an amount of flexure variable by the rotation of the rotation unit, and
wherein a protective cover is integrated with the board base for holding the engaging member, and covers the finder board that does not rotate together with the rotation unit.

* * * * *